Oct. 27, 1964  G. M. SISSON  3,154,626
DEVICE FOR DETERMINING THE POSITION OF A MARK IN
A TRANSPARENT OR TRANSLUCENT PLATE OR FILM
Filed Jan. 12, 1961  2 Sheets-Sheet 2

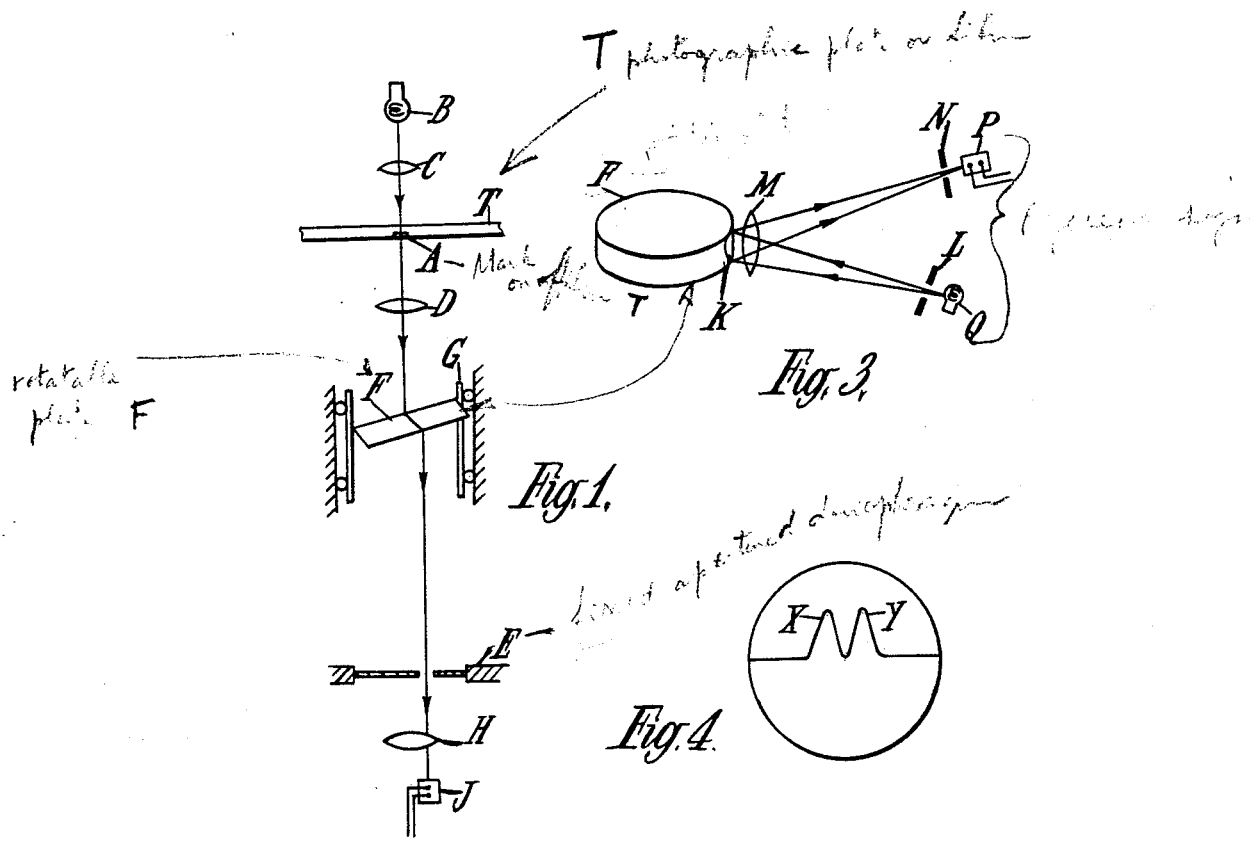

INVENTOR.

BY

United States Patent Office 3,154,626
Patented Oct. 27, 1964

3,154,626
DEVICE FOR DETERMINING THE POSITION OF A MARK IN A TRANSPARENT OR TRANSLUCENT PLATE OR FILM
George Macfarlan Sisson, Newcastle-upon-Tyne, England, assignor to Sir Howard Grubb Parsons & Company Limited, Newcastle-upon-Tyne, England
Filed Jan. 12, 1961, Ser. No. 82,349
Claims priority, application Great Britain, Jan. 29, 1960, 3,333/60
6 Claims. (Cl. 88—14)

This invention relates to photographic plate or film measuring devices.

Such devices usually comprise means for moving a photographic plate or film in one or two directions in the plane of the emulsion layer. Marks in the emulsion, for example, star images or spectral lines in the case of photographic plate or film used in conjunction with telescopes, are then observed by an optical system giving magnification and the plate or film is moved to bring the mark into alignment with a fixed fiducial mark.

The amount of movement of the film or plate is then measured by some means, for example, by counting the revolutions or part revolutions of a screw imparting movement to the plate or film.

Devices of this kind impose on the operator the need for making continual judgments of the position at which the fiducial mark accurately bisects the mark in the emulsion layer and this is often difficult and tiring.

The object of the present invention is to provide means for presenting the operator with a simple criterion for this bisection.

The invention consists in a device for determining the position of a mark in a transparent or translucent plate or film, for example, a mark formed in a photographic emulsion by a photographed object, which device embodies means for illuminating the mark, means for focusing an image thereof on an apertured diaphragm, means for producing relative displacement between the image and the diaphragm, a photosensitive device adapted to receive light through the diaphragm to produce an electrical signal when the image falls upon an aperture in the diaphragm, means for producing a reference signal at a chosen position of the diaphragm and image and means for comparing the times of the reference signal and the signal from the photosensitive device, the arrangement being such that by adjusting the position of the mark in the plate or film relatively to the measuring device the two electrical signals can be made to occur simultaneously.

The invention also consists in a device for determining the position of a mark in a transparent or translucent plate or film, for example a mark formed in a photographic emulsion by a photographed object, which device embodies means for illuminating the mark, means for focussing an image thereof on an apertured diaphragm, means to produce relative rotation between the image and the diaphragm about a fixed axis passing through the diaphragm, a photosensitive device receiving light through the diaphragm to produce an electrical signal when the image falls upon an aperture in the diaphragm, means for producing a reference signal at a chosen relative angular position of the diaphragm and image and means for comparing the times of the reference signal and the signal from the photosensitive device, the arrangement being such that by adjusting the position of the mark in the transparent plate or film relative to the rest of the measuring device the two electrical signals can be made to occur simultaneously.

The invention also consists in a device for measuring the relative positions of marks formed in the emulsion of a photographic plate or film by a photographed object, or objects, in which device each mark is illuminated in turn and an image thereof directed through a rotating transparent plate which produces lateral displacement of the image and thus by its rotation causes the image to move in a loop about the axis of rotation of the plate, the image falling on an apertured fixed diaphragm which contains a slit so that the image crosses the slit once in every revolution of the plate, a photosensitive device being provided to receive light through the slit so that it produces an electrical signal whenever the image coincides with the slit, the transparent plate having means associated therewith for producing a reference signal at a chosen angular position of the plate, these two signals, the signal from the photosensitive device and the reference signal, being compared on an oscilloscope and the emulsion moved till they occur simultaneously.

The invention also consists in a measuring device as set forth in the preceding paragraph in which adjustments in the position of the emulsion are made along two axes lying in a single plane at right angles to one another in which case the diaphragm is arranged to have two mutually perpendicular slits in it and there are two corresponding reference signals for comparison.

The invention also consists in a device as set forth in either of the preceding two paragraphs in which the means producing the reference signal comprise a mirror or mirrors on the transparent plate onto which mirror light from a fixed fiducial source is thrown, the arrangement being such that when the reflected image of the fixed fiducial source coincides with a slit in a second fixed diaphragm the light falls upon a photosensitive device behind the second diaphragm which photosensitive device produces the reference signal.

The invention also consists in a device as set forth in either of the first two of the three preceding paragraphs wherein the means producing the reference signal comprises a fixed light source from which light falls upon a flat reflecting surface on the rotating transparent plate, the arrangement being such that when the reflected light from this surface passes through an aperture in a second fixed diaphragm it falls upon a photosensitive device behind the diaphragm which device produces the reference signal.

The invention also consists in a device as set forth in either of the first two of the four preceding paragraphs wherein the means producing the reference signal comprise electrical contacts on the transparent plate which contacts complete a circuit to generate the reference signal.

The invention also consists in a device as set forth in the first of the six preceding paragraphs wherein relative rotation between the image and the diaphragm about a fixed axis is produced by rotating the diaphragm and fixing the transparent plate.

The invention also consists in a device as set forth in either of the two preceding paragraphs wherein a reference signal is produced by a mirror or mirrors on the rotating diaphragm on which mirror or mirrors light from a fixed fiducial source is thrown the arrangement being such that when the reflected image coincides with a slit in a second fixed diaphragm the light falls on a photosensitive device behind the diaphragm which device produces the reference signal.

The invention also consists in a device as set forth in either of the first two of the preceding three paragraphs wherein the means producing the reference signal comprise electrical contacts on the rotating diaphragm which contacts complete a circuit to generate the reference signal.

The invention also consists in a device substantially

3 as hereinafter described with reference to the accompanying diagrammatic drawings in which:

FIGURE 1 shows one form of the device in accordance with the invention.

FIGURE 2 is a plan view of the diaphragm of FIGURE 1.

FIGURE 3 shows an arrangement for generating a reference signal.

FIGURE 4 is a representation of the signal produced by an oscilloscope.

FIGURE 5 shows an alternative arrangement for generating a reference signal.

Figure 6:
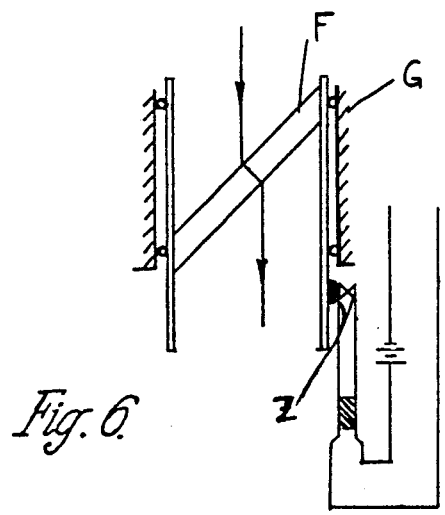
FIGURE 6 shows a further alternative arrangement for generating a reference signal.

In carrying the invention into effect in the forms illustrated by way of example and referring to FIGURE 1, a photographic plate or film T has an emulsion film on which appear a series of marks on areas such as A. The mark may, for example, be a star image or spectral line such as is obtained with photographic plates used with telescopes. The mark may be a bright patch on a dark background or vice versa. The mark is illuminated by a lamp B and condensing lens C. An image of the mark is focussed by lens D on a fixed apertured diaphragm E and interposed between D and E is a transparent plate F which, because it is inclined so that light from B strikes it at an angle, causes lateral displacement of the image of A as shown. Instead of a plate as shown a wedge or prism may be used to displace the beams laterally. The plate F is held in a mount G capable of rotation about an axis which may be parallel to the optical axis of the lens D.

In operation the mount G is rotated continuously by means which may comprise an electric motor and gearing (not shown). The rotation of the mount G and hence of the plate F causes the image of A on the apertured diaphragm E to rotate in a loop or circle as can best be seen in FIGURE 2. The diaphragm E acts as an obscuring screen having narrow slits $S_1$, $S_2$ therein. There may be only one slit or there may be two slits. If measurement of the position of A in the emulsion in only one direction is required only one slit is necessary. If the position of A is required in two directions then two slits are required. If the two fixed directions or axes about which the position of A is to be determined are at right angles to one another then the slits $S_1$ and $S_2$ must be at right angles to one another as shown.

Light from the slit or slits $S_1$, $S_2$ passes through a lens H and falls upon a photosensitive device J. When the image of A coincides with one of the slits the light falling on J is momentarily increased or decreased and the change of electrical output from J may be shown on a cathode ray oscilloscope in a well known manner.

Referring to FIGURE 3 the rotating plate F has fixed thereto a mirror K which, every time the plate F is in a certain position, reflects light from a fixed aperture L, which is illuminated by lamp Q, via a collimating lens M through an aperture in a fixed diaphragm N onto a photosensitive device P. If the diaphragm E contains two slits then the plate F carries two mirrors placed so that when A is correctly positioned a reference signal is generated each time the image coincides with a slit. Two photosensitive detectors one for each mirror can be employed or both mirrors can reflect light on a single detector.

The signal from P is combined with the signal from J, preferably with reversed sign and displayed as a single trace on an oscilloscope.

If a slit is used as the aperture in the diaphragm N it can be inclined to the beam at an angle to compensate for any errors due to wobble in the bearings carrying G.

In operation the plate or film is moved in one direction until the image of A regularly crosses one of the slits $S_1$ or $S_2$ of the diaphragm E and thus gives a signal which is displayed on an oscilloscope together with the reference signal. When A is correctly positioned there is an instant when the position of mirror K is such that the image of A falls on the slit in the diaphragm E giving a reference signal from P simultaneously with the signal from J and when the two signals are of different waveform the resulting combined waveform as seen on the oscilloscope is as shown in FIGURE 4.

The criterion for bisection of the signal from J by the signal from P may conveniently be when the two peaks X and Y, formed by superimposing the two signals, are equal in height. Any other relative position of the two signals is acceptable provided it is recognisable each time so that the same relative position is obtained each time.

As mentioned above when measurement of the position of A is required about two fixed axes, two slits are provided in the diaphragm E and two mirrors K are required. In an alternative arrangement a second optical system M, N, L, P and Q may be arranged to view the same mirror K at a different angular position of the plate F.

In such cases the two signals from J and the two signals from P for each revolution of G may be displayed side by side on one oscilloscope or may be shown separately on two oscilloscopes.

In a further form as shown in FIG. 6, the plate F may carry instead of a mirror K and associated optical system, electrical contacts Z so that the reference signal is generated by completing or interrupting an electrical circuit whenever the image coincides with a slit in the diaphragm E.

The plate F may be placed anywhere between the plate T and the diaphragm E.

FIGURE 5 shows an alternative way of generating a reference signal from the transparent plate F.

The light illuminating the image A passes through the lens D and falls upon the inclined plate F and it is arranged that a proportion of this light is reflected from the surface of F to fall upon a lens O and thence onto a diaphragm R with an aperture in it. The lens O produces an image of lens D upon the diaphragm and at a certain angular position of G this image will pass through the aperture in R to fall upon a photosensitive device W which will give the reference signal. A second set of parts O, R and W may be used for a second reference signal at right angles to the first.

By arranging the signals to be presented on the oscilloscope in some easily recognisable form it is easy to tell when the mark A is in a certain fixed position relative to the fiducial mark constituted by slit L. The criterion shown in FIGURE 4 is only one of many which can be adopted.

Whilst the invention has been described with reference to a rotating plate F and fixed diaphragm it is not limited to such an arrangement; the sole criterion is that there should be relative displacement between the diaphragm E and the image of A. This can be obtained by producing relative rotation between the diaphragm E and the image of A for instance as described above or by having a rotating diaphragm E and a fixed plate F.

Also whilst the invention has been described with particular reference to means producing the relative rotation between the image and the diaphragm it is not necessary to produce relative rotation and relative displacement of the image and the diaphragm would suffice if measurements were taken in one coordinate only. In such circumstances oscillatory relative motion could be adopted.

The means for measuring the movement of the image in the emulsion necessary to obtain a signal simultaneously with the reference signal may be of any of the well known forms used with such devices.

It will be appreciated that the foregoing details are given by way of example only and that any desired modifications may be made to the invention in order to suit varying requirements.

I claim:

1. A device for determining the position of a mark on a body relative to a datum or another mark on the body, such as for example the position of a mark formed in a photographic emulsion by a photographed object, wherein said device comprises means for illuminating the mark, an apertured diaphragm, means for focussing an image of the mark on said apertured diaphragm, means for producing relative displacement between the image and the diaphragm, a photosensitive device for receiving light through the diaphragm to produce an electrical signal when the image falls upon the aperture in the diaphragm, means for producing a reference signal at a chosen position of the diaphragm and image, said means forming part of the said means for producing relative displacement between the image and the diaphragm, means for comparing the times at which the reference signal and the signal from the photosensitive device occur, and means for adjusting the position of the mark to cause the two signals to occur simultaneously.

2. A device for determining the position of a mark in a transparent or translucent plate or film, relative to a datum or to another mark for example the position of a mark formed in a photographic emulsion by a photographed object, which device comprises means for illuminating the mark, an apertured diaphragm, means for focussing an image of the mark on the apertured diaphragm, means to produce relative rotation between the image and the diaphragm about a fixed axis passing through the diaphragm, a photosensitive device receiving light through the diaphragm to produce an electrical signal when the image falls upon the aperture in the diaphragm, means for producing a reference signal at a chosen relative angular position of the diaphragm and image, said signal producing means forming part of the means producing relative rotation between image and diaphragm, and means for comparing the times at which the reference signal and the signal from the photosensitive device occur, means being provided to adjust the position of the mark to make the two electrical signals occur simultaneously.

3. A device for determining the position of a mark on a body relative to a datum or another mark on the body, such as for example the position of a mark formed in a photographic emulsion by a photographed object, said device comprising means for illuminating the mark, a fixed apertured diaphragm, means for focussing an image of the mark on the fixed diaphragm, a rotatable transparent plate interposed in the light path before the diaphragm and producing lateral displacement of the image, means for rotating said plate so as to cause the image to move in a loop about the axis of the rotation of the plate, a photosensitive device for receiving light through the apertured diaphragm and to produce a signal whenever the image coincides with an aperture in the diaphragm, means for generating a reference signal including means located on the transparent plate, to generate a reference signal at a chosen angular position of the plate, means for comparing the times at which the reference signal and the signal from the photosensitive device occur, and means for adjusting the position of the mark so that the two signals occur simultaneously.

4. A device as claimed in claim 3, in which the apertured diaphragm has two slits defined therein arranged in two mutually perpendicular directions.

5. A device as claimed in claim 3, in which the means producing the reference signal comprise at least one mirror on the transparent plate, a fixed fiducial source of light from which light is directed on to the mirror, a second fixed apertured diaphragm, and a photosenitive device for receiving light reflected from said mirror via said diaphragm.

6. A device as claimed in claim 3, in which the means producing the reference signal comprise electrical contacts on the transparent plate, which contacts are arranged to complete an electrical circuit at a chosen angular position of the plate and thereby generate said reference signal.

References Cited in the file of this patent

UNITED STATES PATENTS

| | | |
|---|---|---|
| 2,513,367 | Scott | July 4, 1950 |
| 2,820,906 | Miller | Jan. 21, 1958 |
| 2,884,540 | Shockley | Apr. 28, 1959 |
| 2,922,224 | Gray | Jan. 26, 1960 |
| 2,922,332 | Lentz et al. | Jan. 26, 1960 |
| 2,924,768 | Farrand et al. | Feb. 9, 1960 |
| 2,931,910 | Ostergren et al. | Apr. 5, 1960 |
| 2,939,962 | Miller | June 7, 1960 |
| 2,947,872 | Carbonara et al. | Aug. 2, 1960 |
| 2,949,672 | Ostergren | Aug. 23, 1960 |
| 2,967,246 | Ostergren | Jan. 3, 1961 |
| 2,997,588 | Wilcox | Aug. 22, 1961 |
| 2,997,699 | Lovell | Aug. 22, 1961 |

FOREIGN PATENTS

| | | |
|---|---|---|
| 1,178,699 | France | Dec. 15, 1958 |